United States Patent
Murata et al.

(10) Patent No.: US 6,845,681 B2
(45) Date of Patent: Jan. 25, 2005

(54) STARTER MOTOR HAVING SEAL MEMBER FOR SEALING AXIAL END OF HOUSING

(75) Inventors: Mitsuhiro Murata, Niwa-gun (JP); Shinji Usami, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/093,613

(22) Filed: Mar. 11, 2002

(65) Prior Publication Data

US 2002/0157489 A1 Oct. 31, 2002

(30) Foreign Application Priority Data

Apr. 27, 2001 (JP) ........................................ 2001-131266

(51) Int. Cl.[7] .............................................. F02N 11/00
(52) U.S. Cl. ................................. 74/6; 74/7 R; 74/7 A; 277/490
(58) Field of Search .............................. 74/6, 7 R, 7 A, 74/7 E; 277/490, 551, 553

(56) References Cited

U.S. PATENT DOCUMENTS

| | | | | |
|---|---|---|---|---|
| 3,752,543 A | * | 8/1973 | Schmidt ..................... 277/551 |
| 4,895,035 A | * | 1/1990 | Okamoto et al. ............. 74/7 A |
| 4,995,275 A | * | 2/1991 | Okamoto et al. ............. 74/7 A |
| 5,054,329 A | * | 10/1991 | Morishita et al. ............. 74/7 R |
| 5,137,285 A | * | 8/1992 | Pick ........................... 277/550 |
| 5,220,844 A | * | 6/1993 | Mills ............................... 74/6 |
| 5,317,933 A | * | 6/1994 | Rometsch ..................... 74/7 R |
| 6,062,734 A | * | 5/2000 | Bundgart ..................... 277/551 |
| 6,280,095 B1 | * | 8/2001 | Furukoshi et al. .......... 384/489 |

FOREIGN PATENT DOCUMENTS

| JP | U 2-96471 | 8/1990 |
|---|---|---|
| JP | A 2-218866 | 8/1990 |

* cited by examiner

Primary Examiner—David A. Bucci
Assistant Examiner—Bradley J. Van Pelt
(74) Attorney, Agent, or Firm—Oliff & Berridge, PLC

(57) ABSTRACT

A front end of a starter motor housing is sealed by a resilient seal member disposed between a bearing and a front end wall of the housing. A shaft carrying a pinion at its front end is rotatably and slidably supported by the bearing in an over hang fashion. The seal member is a cup-shaped ring having a circular outer wall, a bottom wall and a center hole. A sealing lip slidably contacting the rotating shaft is formed around the center hole. The circular outer wall of the seal member is tightly and hermetically held between an outer ring of the bearing and front end wall of the housing, so that the seal member is not displaced in the axial direction. The bottom wall is S-shaped forming a depressed portion facing the bearing to provide more space for retaining lubricant therein.

10 Claims, 4 Drawing Sheets

STARTER MOTOR HAVING SEAL MEMBER FOR SEALING AXIAL END OF HOUSING

CROSS-REFERENCE TO RELATED APPLICATION

This application is based upon and claims benefit of priority of Japanese Patent Application No. 2001-131266 filed on Apr. 27, 2001, the content of which is incorporated herein by reference.

BACKGROUND OF THE INVENTION

1. Field of the Invention

The present invention relates to a starter motor for cranking an internal combustion engine, the starter motor having a seal member disposed at a front end of a housing.

2. Description of Related Art

A starter motor in which a pinion shaft is supported by a bearing fixed to an end of a housing and a pinion is positioned outside the bearing has been known hitherto. An example of such a starter motor is disclosed in JP-U-2-96471. A relevant portion of such a conventional starter motor is shown in FIG. 4. A ball bearing 110 having an inner ring 111, an outer ring 112 and bearing balls 114 is disposed at an end of a housing 100. A pinion shaft 120 having a pinion 130 at its end is rotatably supported by the ball bearing 110. The pinion shaft 120 is supported slidably in its axial direction. A seal member having a circular wall portion 141 and a lip portion 140 is mounted outside the ball bearing 110. The lip portion 140 slidably contacts the rotating pinion shaft 120 thereby to prevent water or other foreign particles from entering into the housing 100.

As shown in FIG. 4, there is a certain space between the ball bearing 110 and the circular wall 141. Therefore, the seal member tends to move in the axial direction when the seal member is not firmly fixed to the housing 100. When the seal member moves toward the ball bearing 110, its circular wall portion 141 abuts a seal plate 113 disposed between the inner ring 111 and the outer ring 112 of the ball bearing 110. The seal plate 113 is pushed inwardly by the circular wall portion 141, and thereby the balls 114 of the bearing 110 are also pushed. This generates a friction in the ball bearing 110, and thereby the function of the ball bearing 110 is adversely affected. Further, if the seal member moves inwardly, a space between the seal member and the housing 100 is formed, and foreign particles may enter into the housing 100 through that space. This means that a sufficient sealing function may not be secured.

SUMMARY OF THE INVENTION

The present invention has been made in view of the above-mentioned problem, and an object of the present invention is to provide an improved sealing structure in a starter motor, which provides a good sealing without adversely affecting a rolling bearing function.

A starter motor for an internal combustion engine is composed of an electric motor, a magnetic switch, a pinion shaft and other components, all contained in a housing. A pinion which engages with a ring gear of the internal combustion engine is connected to a front end of the pinion shaft. The pinion shaft is connected to the electric motor via a one-way clutch and supported by a rolling bearing such as a ball bearing in a overhang fashion. Upon energization of the magnetic switch, the electric motor is rotated and the pinion is pushed to a position where the pinion engages with the ring gear to crank the internal combustion engine. When the magnetic switch is deenergized, the electric motor is switched off and the pinion returns to its original position.

The bearing is fixed to a front end of the housing, and the pinion shaft is, rotatably and silably in the axial direction, supported by the bearing. A front side of the bearing is sealed by a seal member made of a resilient material such as rubber. The seal member is a cup-shaped ring having a circular outer wall, a bottom wall and a center hole. A sealing lip slidably contacting the pinion shaft is formed around the center hole. The outer wall of the seal member is tightly and hermetically held between an outer ring of the bearing and a font end wall of the housing. The bottom wall of the seal member is S-shaped, forming a depressed portion facing the bearing. The S-shaped bottom wall provides a high flexibility of the seal member, and the depressed portion enlarges a space between the bearing and the seal member so that lubricant of the bearing is retained in that space.

A pair of the seal members may be disposed at both sides of the bearing to provide a more space for retaining lubricant. The sealing structure of the present invention may be applied to other types of starter motors in which the pinion shaft is supported by a pair of bearings and the pinion is positioned between the pair of bearings.

The seal member of the present invention provides good sealing at the front end of the housing of the starter motor without interfering with rotating portions of the bearing, because the seal member is hermetically and tightly held between the outer ring of the bearing and the front end wall of the housing. The bearing and the sealing lip are properly lubricated by a sufficient amount of lubricant retained in the space between the seal member and the bearing.

Other objects and features of the present invention will become more readily apparent from a better understanding of the preferred embodiments described below with reference to the following drawings.

DETAILED DESCRIPTION OF THE PREFERRED EMBODIMENTS

Figure 1:
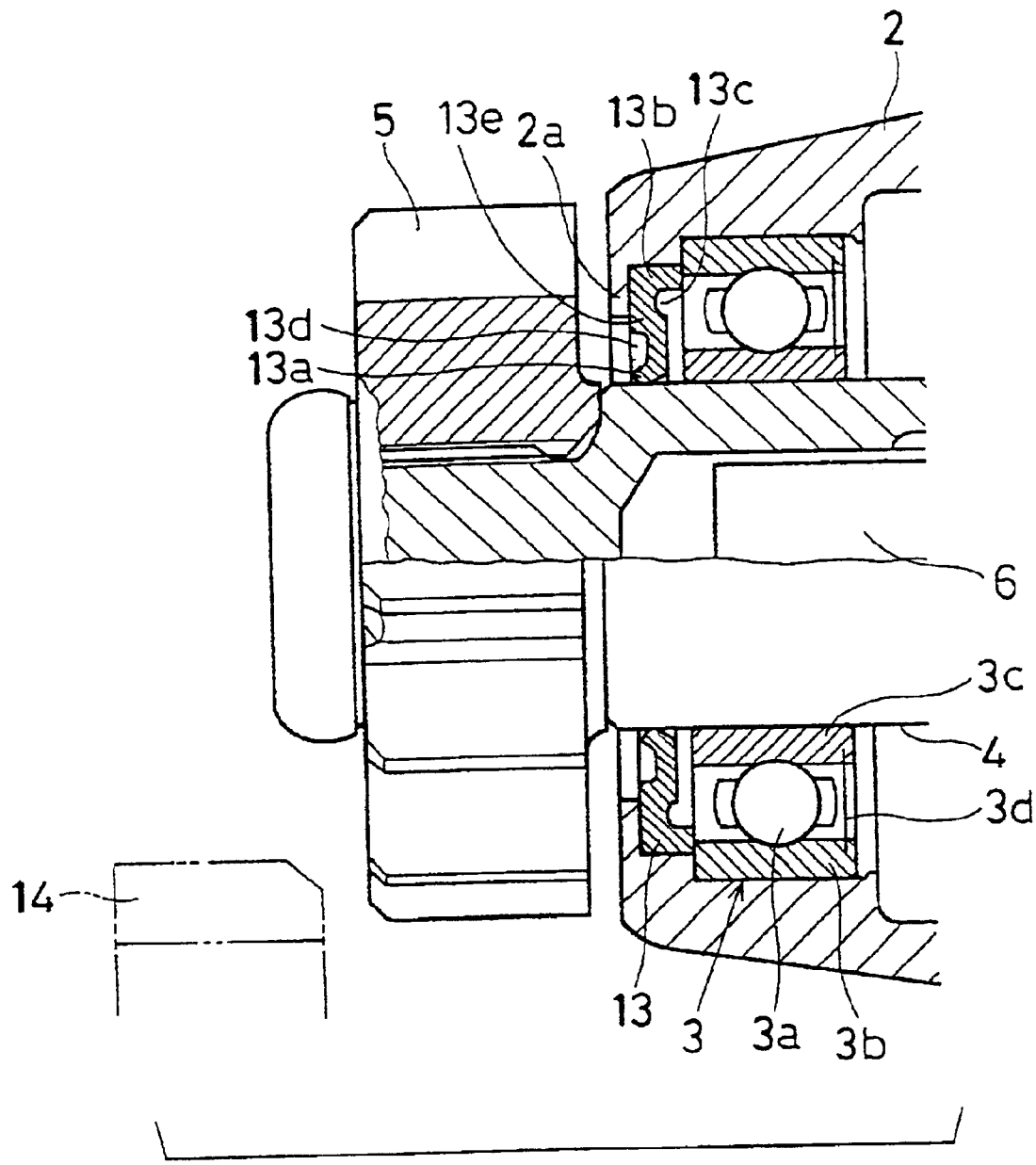
FIG. 1 is a partial cross-sectional view showing an end portion of a starter housing where a ball bearing and a seal member are disposed, as a first embodiment of the present invention.

A first embodiment of the present invention will be described with reference to FIGS. 1 and 2. First, referring to FIG. 2, an entire structure of a starter motor 1 will be described. The starter motor 1 is composed of an electric motor 9 for rotating a pinion shaft 4, a magnetic switch 10 for establishing engagement between a pinion 5 and a ring rear 14 of an internal combustion engine and other components. The pinion shaft 4 is rotatably supported by rolling bearing 3, such as a ball bearing, which is mounted on a front end of a housing 2, and a pinion 5 is connected to a front end of the pinion shaft 4 so that the pinion 5 is positioned outside the ball bearing 3. This type of a starter motor is called an overhang-type starter motor.

The pinion shaft 4 is cylinder-shaped and coupled with an output shaft 6 via a bearing sleeve 7. The pinion 5 is connected to the pinion shaft 4 via straight splines 4a formed at the front end of the pinion shaft 4 and its axial movement is stopped by a stopper ring 8. The output shaft 6 is disposed coaxially with a motor shaft and coupled with the motor shaft via a reduction device such as a planetary gear reduction mechanism (not shown). The electric motor 9 is a known direct-current motor which is driven upon closing contacts contained in the magnetic switch 10. The contacts in the magnetic switch 10 are closed when a starter switch is closed.

The magnetic switch 10 includes a plunger 10a that is movable in the axial direction and a coil 10b that generates magnetic force for driving the plunger 10a in the axial direction. When the plunger 10a is driven rightward (in FIG. 2) by the magnetic force of the coil 10b, the contacts in the magnetic switch 10 are closed thereby to supply electric power to the electric motor 9. At the same time, a one-way clutch 12 coupled with the pinion shaft 4 is driven leftward via a lever 11 connected between the plunger 10a and the one-way clutch 12. When the coil 10b is deenergized, the plunger 10a returns to its original position by a biasing force of a return spring 10c.

The one-way clutch 12 is composed of an outer ring 12a to which a rotational force of the output shaft 6 is transferred via a helical spline, an inner ring 12b formed integrally with the pinion shaft 4 and rollers 12c for transferring a rotational force of the outer ring 12a to the inner ring 12b. The one-way clutch 12 transfers the rotational force of the output shaft 6 to the pinion shaft 4 to crank the internal combustion engine, while preventing a rotational force of the pinion shaft 4 from being transferred to the output shaft 6. In other words, when a rotational speed of the pinion shaft 4 exceeds a rotational speed of the output shaft 6, the one-way clutch 12 interrupts the connection between the pinion shaft 4 and the output shaft 6, thereby preventing overrunning of an armature in the electric motor 9.

The pinion shaft 4 is rotatably supported by the ball bearing 3 fixed to the front end of the housing 2. The pinion shaft 4 is also slidable in the axial direction. A front end wall 2a is formed at the front end of the housing 2. A seal member 13 made of rubber is inserted between the ball bearing 3 and the front end wall 2a.

Figure 2:
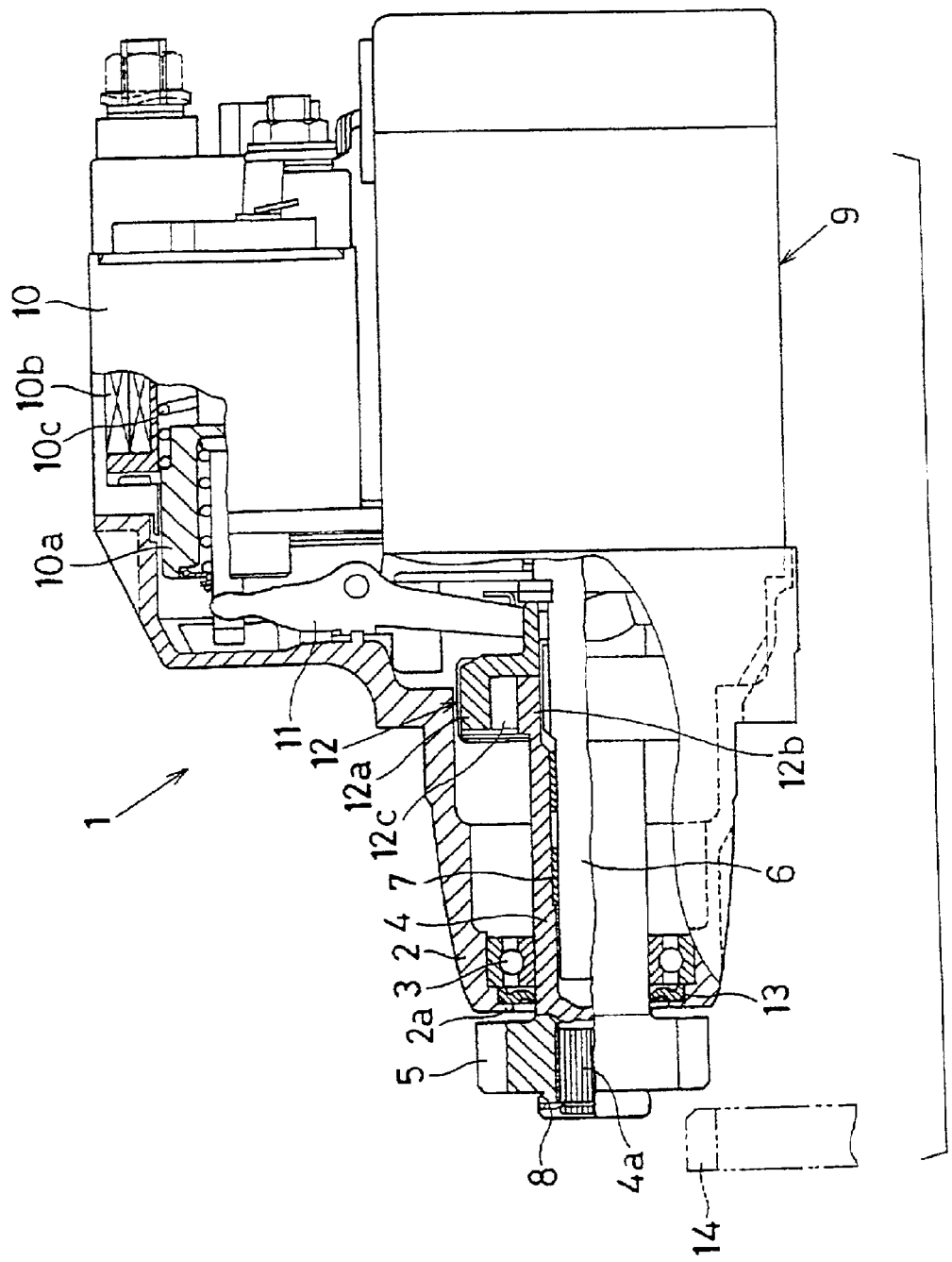
FIG. 2 is a side view showing an entire structure of a starter motor, a portion thereof being broken for showing an inside structure.

Referring to FIG. 1, a structure for sealing the front end of the housing 2 will be described. The ball bearing 3 is a known-type of a ball bearing having an outer ring 3b, an inner ring 3c and balls 3a disposed between the outer ring 3b and the inner ring 3c. The outer ring 3b of the ball bearing 3 is press-fitted in a bearing hole of the housing 3, and the inner ring 3c supports the pinion shaft 4 so that the pinion shaft 4 is rotatable and slidable in the axial direction. Lubricant such as grease is contained inside the ball bearing 3, and a seal plate 3d is disposed at a rear side of the ball bearing 3 (at a side opposite to the pinion side) to prevent the lubricant from flowing out of the ball bearing 3.

The seal member 13 is disposed in a space between the ball bearing 3 and the front end wall 2a of the housing 2. The seal member 13 is made of a resilient material such as rubber and is made substantially in a form of a cup-shaped ring having a circular outer wall 13b, a bottom wall 13e and a center hole. A sealing lip 13a is formed around the center hole. The sealing lip 13a slidably contacts the pinion shaft 4 to provide sealing between the pinion shaft 4 and the housing 2.

The outer periphery of the outer wall 13b is press-fitted in the housing 2, and the outer wall 13b is tightly and hermetically inserted between the front end wall 2a and the outer ring 3b of the bearing 3 so that an axial length of the outer wall 13b is tightly held therebetween. A cross-section of the bottom wall 13e is formed in an S-shape, as shown in FIG. 1, forming a depressed portion 13c facing the ball bearing 3 and another depressed portion 13d facing the front end of the housing 2. The depressed portion 13c enlarges the space between the ball bearing 3 and the seal member 13, and thereby a larger amount of the lubricant can be retained in the space. The seal member 13 does not contact rotating portions of the ball bearing 3 (i.e., the outer ring 3b and the balls 3a) because a certain space is provided between the ball bearing 3 and the bottom wall 13e of the seal member 13.

Operation of the starter motor 1 described above will be briefly explained. Upon closing a starter switch, the coil 10b of the magnetic switch 10 is energized. The magnetic force of the coil 10b pulls the plunger 10a, and thereby the pinion shaft 4 is pushed out together with the one-way clutch 12 which is driven by the lever 11. On the other hand, the contacts in the magnetic switch 10 are closed in response to the movement of the plunger 10a thereby to supply electric power to the electric motor 9. A rotational force of the electric motor 9 is transferred to the output shaft 6 with a rotational speed reduced by the reduction mechanism interposed between the electric motor 9 and the output shaft 6. The rotational force of the output shaft 6 is transferred to the pinion shaft 4 via the one-way clutch 12. By pushing the rotating pinion 5 against the ring gear 14, the pinion 5 engages with the ring gear 14 thereby to crank up the engine.

After completion of the cranking-up, a rotational speed of the pinion 5 engaging with the ring gear 14 exceeds a rotational speed of the output shaft 6. At this time, power transfer from the pinion shaft 4 to the output shaft 6 is interrupted by the one-way clutch 12. In this manner, overrunning of the armature of the electric motor 9 is prevented. Upon opening the starter switch, the magnetic force of the coil 10b disappears and the plunger 10a returns to its original position (the position shown in FIG. 2) by the biasing force of the return spring 10c. In response to the plunger movement, the pinion 5 disengages with the ring gear 14, and the contacts in the magnetic switch 10 are opened thereby to shut down electric power supply to the electric motor 9.

Advantages in the sealing structure according to the present invention are as follows. Since the outer wall 13b of the seal member 13 are tightly held in its axial direction between the front end wall 2a of the housing 2 and the outer ring 3b of the ball bearing 3, the sealing member 13 does not move in the axial direction. Therefore, the seal member 13 does not interfere with the rotating portions of the ball bearing 3, and the bearing function is not adversely affected by the seal member 13. Since the outer periphery of the outer wall 13b is press-fitted in the housing 2 and the outer wall 13b is tightly held in its axial direction between the front end wall 2a and the outer ring 3b of the ball bearing 3, a good sealing is provided not only between the housing 2 and the seal member 13 but also between the outer ring 3b and the seal member 13.

Since all portions of the seal member 13 are integrally made of a resilient material such as rubber, the seal member 13 is easily and manually inserted into its position without using any inserting jig. If a metallic outer ring is used covering the outer periphery of the outer wall 13b as in a conventional seal member, it is difficult to insert the seal member into its position without using a jig.

Since the bottom wall 13e of the seal member 13 is formed in an S-shape, resiliency of the seal member 13 is enhanced. Therefore, the sealing lip 13a contacts the pinion shaft 4 with sufficient flexibility, and possible deformation of the outer wall 13b occurring when the seal member 13 is forcibly inserted into its position is absorbed by the S-shaped bottom wall 13e. Since the depressed portion 13c facing the ball bearing 3 is formed on the bottom wall 13e, a larger amount of lubricant of the ball bearing can be retained in the space between the ball bearing 3 and the seal member 13. The abrasion of the sealing lip 13a is alleviated by the lubricant retained in the space. Further, foreign particles are prevented from entering into the housing 2 by the retained lubricant.

A second embodiment of the present invention will be described with reference to FIG. 3. In this embodiment, another sealing member 15 is disposed at the rear side of the ball bearing 3 (the side opposite to the front end wall 2a). Other structures are the same as those of the first embodiment.

Figure 3:
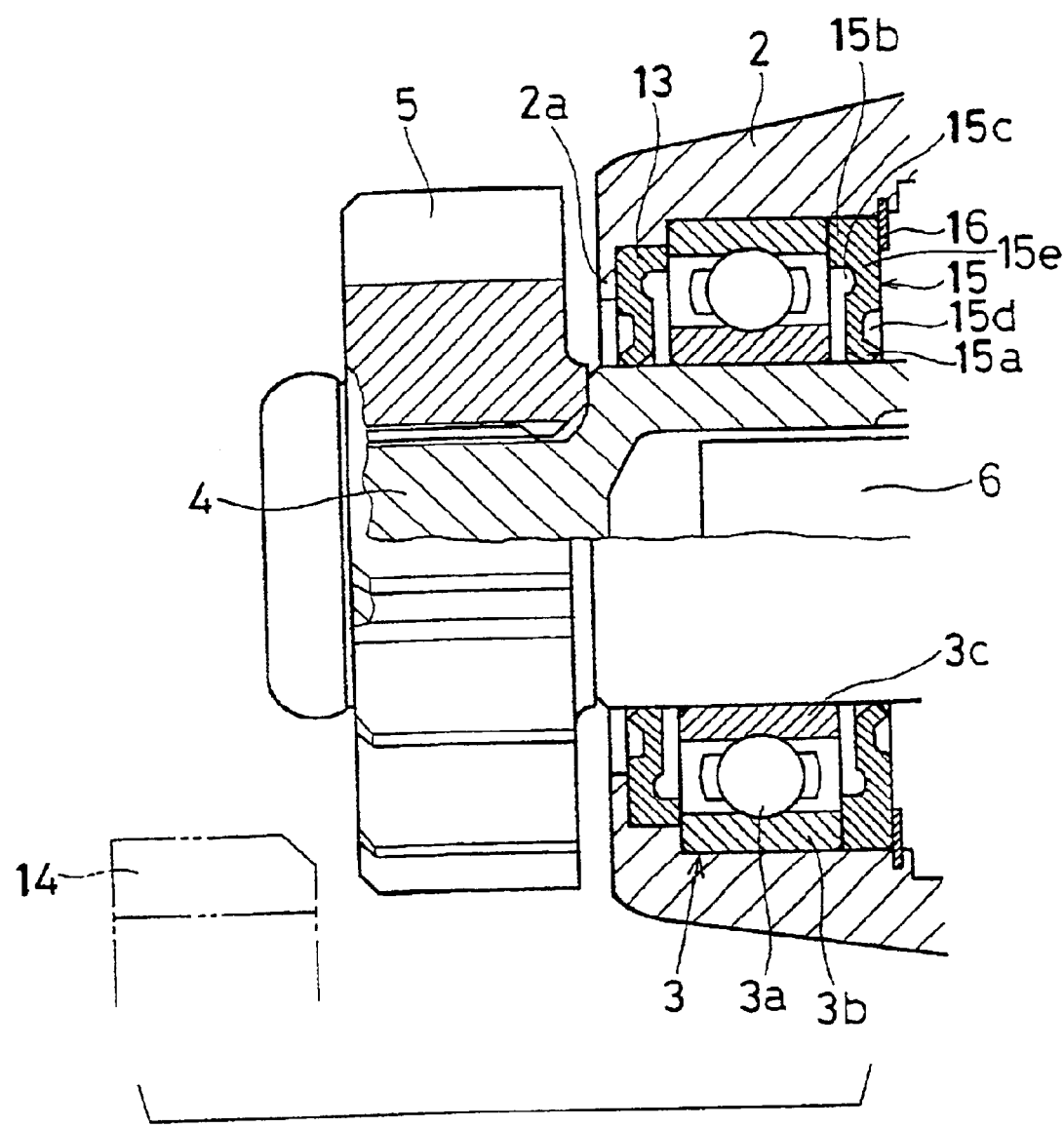
FIG. 3 is a partial cross-sectional view showing the same portion as that shown in FIG. 1, as a second embodiment of the present invention.
Figure 4:
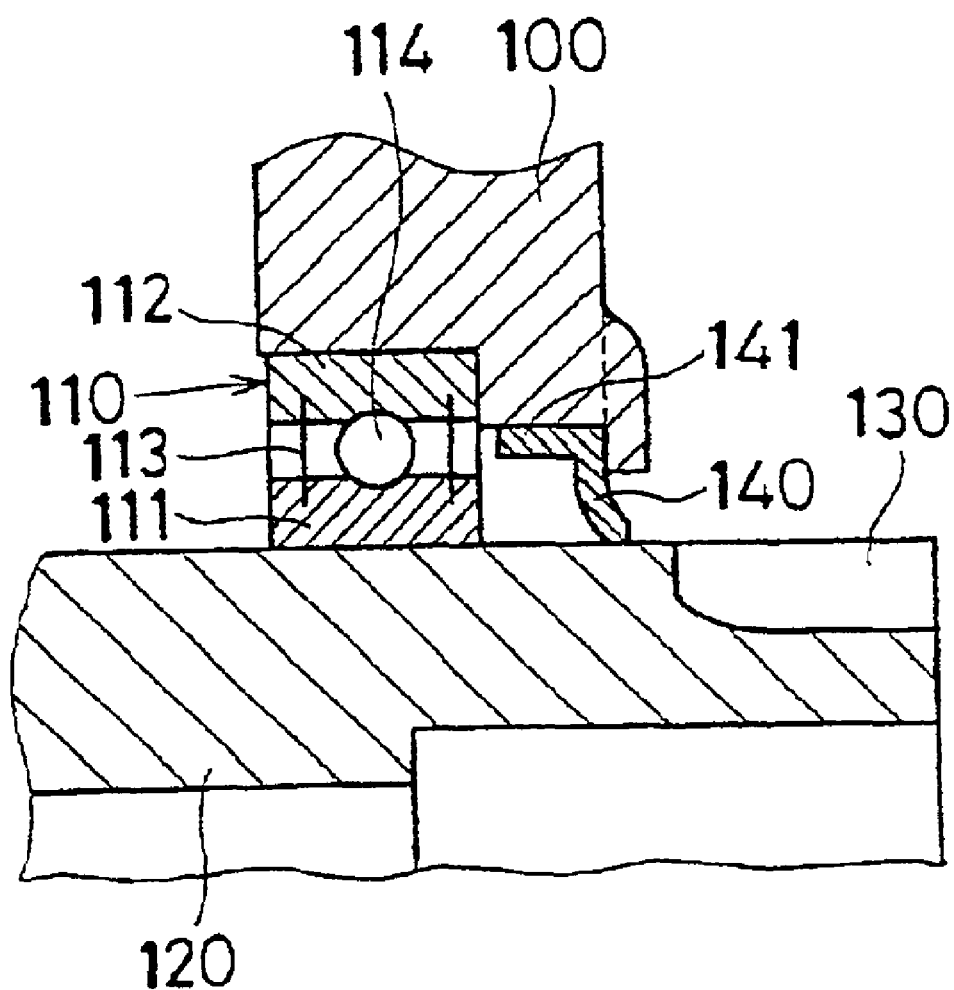
FIG. 4 is a partial cross-sectional view showing a relevant portion of a conventional starter motor.

As shown in FIG. 3, the seal member 15 is made of a resilient material and has a similar shape as the seal member 13 described above. The seal member 15 includes an outer wall 15b, a bottom wall 15e having depressed portions 15c and 15d and a sealing lip 15a formed around a center hole. The bottom wall 15e is inverse-S-shaped. The seal member 15 is mounted in the housing in the similar manner as the seal member 13. The outer wall 15b is press-fitted in the housing 2 and is tightly held in its axial direction between the outer ring 3b of the ball bearing 3 and a washer 16 which is fixedly connected to the housing 2.

Since the seal member 13 is disposed at the front side and the other seal member 15 at the rear side, the lubricant is further sufficiently retained in the spaces formed at both sides of the ball bearing 3, thereby further improving the lubrication. In addition, the ball bearing 3 is protected by both seal members against foreign particles.

The present invention is not limited to the embodiments described above but it may be variously modified. For example, the ball bearing 3 may be replaced with other rolling bearings such as a needle bearing. Though the sealing structure of the present invention is applied, in the foregoing embodiments, to a starter motor, in which the pinion shaft 4 having the pinion 5 connected to the front end of the pinion shaft 4 is supported by the ball bearing 3 in an overhang fashion, it may be also applied to a starter motor in which the pinion shaft is supported by a pair of bearings and the pinion is positioned between the pair of the bearings.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A starter motor for cranking an internal combustion engine, the starter motor comprising:
   a housing containing an electric motor therein, the housing including a front end wall;
   a rolling bearing having an outer ring fixedly supported in a cylindrical space formed at a front side of the housing;
   a pinion shaft rotatably supported by the rolling bearing; and
   a seal member for sealing a front end of the housing, the seal member being disposed in an annular space formed between the front end wall and the cylindrical space, a diameter of the annular space being smaller than that of the cylindrical space, wherein:
   the seal member is solely made of rubber in a form of a cup having an outer wall, a bottom wall and a sealing lip,
   the outer wall of the seal member is press-fitted in the annular space and tightly held between the front end wall of the housing and the outer ring of the rolling bearing without interposing anything therebetween,
   the sealing lip slidably contacts the pinion shaft to seal the front end of the housing,
   the bottom wall has a depressed portion that faces the rolling bearing and enlarges a space between the rolling bearing and the bottom wall of the seal member, and lubricant is retained in the enlarged space, and the bottom wall of the seal member has an S-shaped cross-section so that the sealing lip flexibly contacts the pinion shaft.

2. The starter motor as in claim 1, wherein the rolling bearing is a ball bearing.

3. The starter motor as in claim 1, wherein a pinion is connected to a front end of the pinion shaft, and the pinion shaft is supported by the rolling bearing in an overhang fashion.

4. The starter motor as in claim 3, wherein: a second seal member having a form substantially symmetrical with the seal member is disposed at another side of the rolling bearing which is opposite to a side where the seal member is disposed, so that the rolling bearing is sandwiched between the seal member and the second seal member.

5. A starter motor for cranking an internal combustion engine, the starter motor comprising:
   an electric motor;
   a housing axially extending from the electric motor and defining an opening on a front end wall thereof;
   a bearing having a bearing inner ring and a bearing outer ring fixedly supported on an inside surface of the housing;
   a pinion shaft extending through the opening of the front wall and the bearing inner ring, the pinion shaft being supported on the bearing inner ring in a manner that the pinion shaft is rotatable in a circumferential direction and slidable in an axial direction;
   a pinion connected to a front end of the pinion shaft; and
   a seal member having an outer wall and a sealing lip, the outer wall being tightly held between the front wall and the bearing outer ring, the sealing lip being in slidable contact with an outer surface of the pinion shaft, wherein:
   the housing defines a first cylindrical bore in which the bearing outer ring is fixedly supported, and a second cylindrical bore located between the front wall and the first cylindrical bore,
   the second cylindrical bore has a diameter that is larger than that of the opening on the front end wall and is larger than an inner diameter of the bearing outer ring so as to enable the outer wall of the seal member to be tightly held between the front wall and the bearing outer ring,
   the first cylindrical bore has a diameter that is larger than that of the second cylindrical bore so that the housing defines a stepping wall on which the bearing outer ring axially rests in order to secure an axial length of the outer wall of the seal member while the outer wall is tightly held between the front wall and the bearing outer ring, and
   the seal member further includes an S-shaped bottom wall located between the outer wall and the sealing lip, the S-shaped bottom wall defining an inner depressed portion facing the bearing and retaining lubricant for the bearing.

6. The starter motor as in claim 5, wherein the seal member is made entirely of rubber.

7. The starter motor as in claim 6, wherein the S-shaped bottom wall is arranged to define an outer depressed portion radially outside the sealing lip.

8. The starter motor as in claim 7, wherein the S-shaped bottom wall is arranged to direct the sealing lip to a front side.

9. The starter motor as in claim 8, wherein the bearing further includes a seal plate only on a rear side opposite to the side on which the seal member is located.

10. The starter motor as in claim 9, wherein the bearing is a ball bearing having balls installed between the bearing outer ring and the bearing inner ring.

* * * * *